(12) United States Patent
Green

(10) Patent No.: US 7,445,657 B2
(45) Date of Patent: Nov. 4, 2008

(54) APPLICATION METHODS FOR FINE POWDERS AND USES THEREOF

(76) Inventor: Kerry Green, 501-5 Donald Street, Winnipeg, Manitoba (CA) R3L 2T4

( * ) Notice: Subject to any disclaimer, the term of this patent is extended or adjusted under 35 U.S.C. 154(b) by 580 days.

(21) Appl. No.: 10/468,854

(22) PCT Filed: Feb. 25, 2003

(86) PCT No.: PCT/CA03/00253

§ 371 (c)(1),
(2), (4) Date: Aug. 25, 2003

(87) PCT Pub. No.: WO03/071855

PCT Pub. Date: Sep. 4, 2003

(65) Prior Publication Data

US 2004/0237615 A1 Dec. 2, 2004

Related U.S. Application Data

(60) Provisional application No. 60/406,990, filed on Aug. 30, 2002, provisional application No. 60/359,301, filed on Feb. 26, 2002.

(51) Int. Cl.
*C05D 9/02* (2006.01)
*A01N 25/26* (2006.01)
(52) U.S. Cl. .................... 71/31; 71/64.01; 71/64.07; 71/64.11; 71/64.13
(58) Field of Classification Search .............. 71/64.07, 71/31, 64.01, 64.11, 64.13
See application file for complete search history.

(56) References Cited

U.S. PATENT DOCUMENTS

| 3,423,199 | A | * | 1/1969 | Silverberg et al. ............... 71/1 |
| 3,576,613 | A | * | 4/1971 | Fleming ........................ 71/28 |
| 3,938,469 | A | * | 2/1976 | Nau ........................... 118/303 |
| 3,941,578 | A | * | 3/1976 | Tucker et al. ................... 71/28 |
| 4,465,017 | A | * | 8/1984 | Simmons ..................... 118/418 |
| 5,994,265 | A |   | 11/1999 | Barclay et al. |
| 6,209,259 | B1 |   | 4/2001 | Madigan et al. |
| 6,766,817 | B2 |   | 7/2004 | da Silva |
| 2004/0194372 | A1 | * | 10/2004 | Smith et al. ................... 47/48.5 |

FOREIGN PATENT DOCUMENTS

| DE | 1592710 | * | 7/1970 |
| DE | 1592709 | * | 2/1971 |
| JP | 53027564 | * | 3/1978 |
| JP | 10167868 | * | 6/1998 |
| JP | 2001026489 | * | 1/2001 |
| WO | 01/45489 | * | 6/2001 |

* cited by examiner

*Primary Examiner*—C. Sayala
(74) *Attorney, Agent, or Firm*—Ade & Company Inc.; Michael R. Williams

(57) ABSTRACT

A method of preparing and coating fertilizer pellets is described. Fertilizer, seed or other materials are added to a blender. Powdered micronutrients are added to the blend (at any time in the process) at rates up to but not exceeding 1% of the total blend. The resulting blend is mixed for a minimum of 20 seconds resulting in an even distribution (coating) of the total blend. The blend is then packaged into bags, spreaders or trucks and stored or applied to the field. Seed or fertilizer is augured or moved via conveyors or other means into seeding equipment or a blender. The finished product is then applied to the field or stored for later applications.

18 Claims, 6 Drawing Sheets

APPLICATION METHODS FOR FINE POWDERS AND USES THEREOF

This application claims priority under 35 USC § 119(e) to Provisional Patent Application Ser. No. 60/359,301, filed Feb. 26, 2002 and to Provisional Patent Application Ser. No. 60/406,990, filed Aug. 30, 2002.

FIELD OF THE INVENTION

The present invention relates generally to the field of fertilizers. More specifically, the present invention relates to a method of coating an agricultural product with a fine powder and the products prepared by this method.

BACKGROUND OF THE INVENTION

Studies of powdered fertilizers or nutrients have shown them to be effective fertilizers, being essentially equivalent to sulfate applications. However, the practical considerations of applying powdered products on a field scale meant that these products have not been available to farmers and producers. For example, most oxide products come in high analysis (60-80 percent actual metal) while most micronutrients are applied in low units per land measure (e.g. 1-10 pounds actual per acre). Furthermore, many micronutrient products are applied in heterogeneous blends with other fertilizers (nitrogen phosphate etc.) These products and/or blends typically have densities in the 45-65 lb per cubic foot range. Existing micronutrient products are typically in the 95+density range meaning that they do not hold their integrity in the blend if it is transported over rough terrain or during extended storage as is common in agriculture. In addition, the higher density means that the nutrients are not spread evenly on the field.

Fertilizer pellets are well-known in the art. For example:

U.S. Pat. No. 4,343,751 teaches a clay agglomeration process which comprises a method of preparing clay pellets which are subsequently coated with a variety of different end products, including fertilizers. It is of note that the pellets are intended to maintain their shape while the coated material is released.

U.S. Pat. No. 5,851,261 teaches coating fertilizer pellets with polyurea which is intended to act as a slow release coating so that the fertilizer is released over a greater period of time.

U.S. Pat. No. 6,192,623 teaches a plant feeder which releases nutrients into the soil using slow release fertilizer pellets.

U.S. Pat. No. 6,001,775 teaches a water soluble fertilizer tablet which is structured to disintegrate in a stream of water for subsequent application as a liquid. In addition, the fertilizer is combined with herbicide.

U.S. Pat. No. 5,030,267 teaches a controlled release fertilizer comprising a calcium metasilicate which is coated with fertilizers or other compounds.

U.S. Pat. No. 6,046,277 teaches a polymer for coating pharmaceutical or agrochemical pellets which comprises polyvinyl acetate in mixture with n-vinylpyrrolidone.

Thus, the prior art teaches pellets which are either arranged to be dissolved for use as liquid fertilizers or are arranged to dispense fertilizers over a long period of time. However, the prior art does not teach a fertilizer which combines the advantages of a powder fertilizer with the ease of application of a pellet.

SUMMARY OF THE INVENTION

According to a first aspect of the invention, there is provided a fertilizer product comprising an agronomic carrier coated with a fine dry powder of a nutrient.

According to a second aspect of the invention, there is provided a method of coating an agronomic carrier with a nutrient comprising:

mixing a quantity of the agronomic carrier and a dry fine powder of the nutrient.

According to a third aspect of the invention, there is provided a kit for applying a nutrient powder to an agronomic carrier comprising at least one nutrient powder having a mesh size of at least 100 and a set of instructions.

DESCRIPTION OF THE PREFERRED EMBODIMENTS

Figure 1:
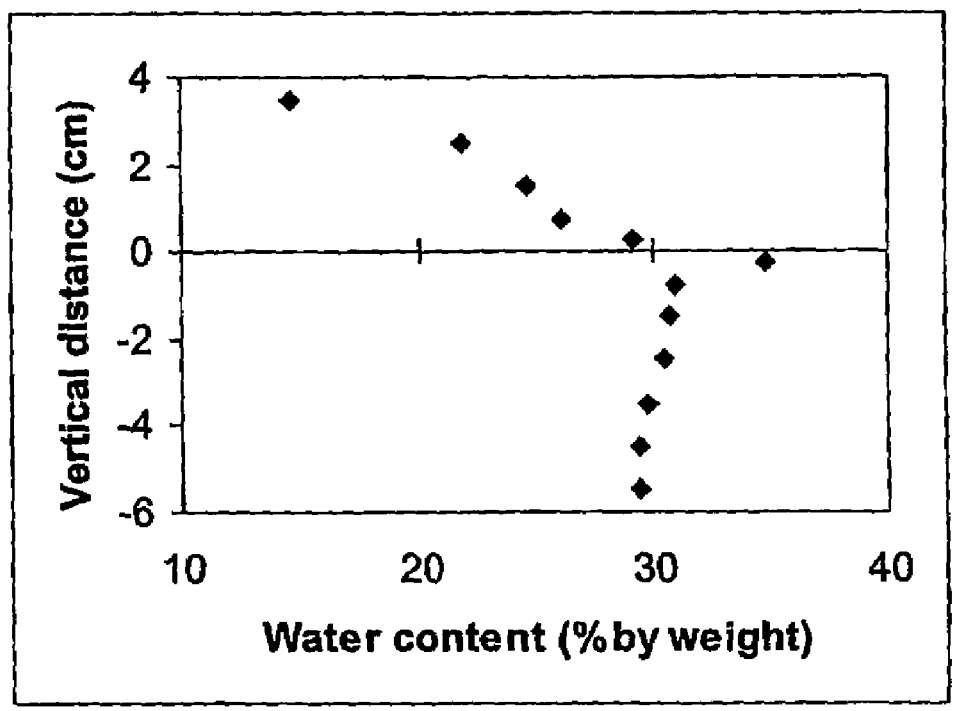
FIG. 1. Water content distribution in the Newdale clay loam column sectioned on Jul. 28, 2001 (one week after watering).
Figure 2:
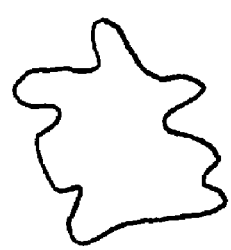
FIG. 2 shows the irregular shape of one embodiment of fertilizer pellet.
Figure 2:
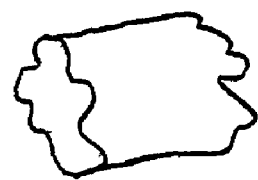
Figure 2:
Figure 2:
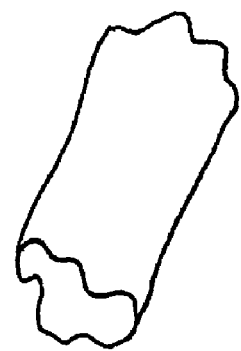
Figure 2:
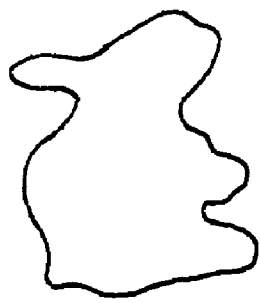
Figure 2:
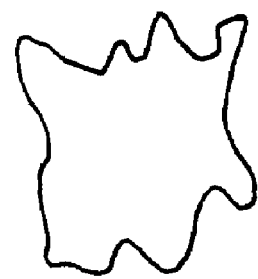

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

DEFINITIONS

As used herein, "nutrient" refers to both micronutrients and macronutrients, for example, zinc, copper, manganese, boron, calcium, iron, calcium sulfate (gypsum), magnesium, molybdenum, chloride, selenium, phosphate, nitrogen, potassium and sulfur.

As used herein, "micronutrients" refers to elements required in small or trace amounts for plant growth, for example, molybdenum, nickel, copper, zinc, manganese, boron, iron and chloride.

As used herein, "macronutrients" refers to elements typically required in large amounts for plant growth, for example, sulfur, phosphorus, phosphate, magnesium, calcium, potassium, nitrogen, oxygen, carbon and hydrogen.

As used herein, "higher analysis" refers to guaranteed minimum analysis. That is, higher analysis means higher concentration of active ingredients versus carriers or impurities.

As used herein, "density" refers to kilograms per cubic meter.

As used herein, "agronomic carrier" refers to an agricultural product, for example, but by no means limited to seeds; Nitrogen, Phosphate, Potassium, Sulfur, Calcium and/or Magnesium fertilizer products; urea prills; dry or granular fertilizer products; and inert or biodegradable pellets.

According to the invention, there is provided a fertilizer product comprising an agronomic carrier coated with a fine dry powder of a nutrient. The agronomic carrier may be selected from the group consisting of: seeds; Nitrogen, Phosphate, Potassium, Sulfur, Calcium and/or Magnesium fertilizer products; urea prills; dry or granular fertilizer products; and inert or biodegradable pellets. The dry nutrient powder is selected from the group consisting of: zinc, copper, manganese, boron, calcium, iron, calcium sulfate (gypsum), magnesium, molybdenum, chloride, selenium, phosphate, nitrogen, potassium, sulfur and mixtures thereof. The nutrient powder may be comprised of at least one nutrient in an oxide form, in a sulfate form or a combination of oxide and sulfate forms, as discussed below.

According to the invention, there is also provided a method of coating an agronomic carrier with a nutrient comprising: mixing a quantity of the agronomic carrier and a dry fine powder of the nutrient. The nutrient powder may be at least 100 mesh and the nutrient powder may be at 0.1-2.0% w/w of the carrier, as discussed below.

According to another aspect of the invention, there is provided a kit for applying a nutrient powder to an agronomic carrier comprising at least one nutrient powder having a mesh size of at least 100 and a set of instructions. As will be appreciated by one of skill in the art and as discussed below, the instructions relate to methods and conditions for applying the dry fine nutrient powder to a number of different agronomic carriers so that users can apply the nutrient powder(s) to carriers of their choosing.

Described herein are fertilizer pellets which are disrupted or disperse rapidly and readily under normal soil conditions and textures. In some embodiments, the pellets have an irregular shape and a rough outer surface so that the pellets have a greater surface area and more readily disperse on contact with soil moisture. That is, the pellets do not have a regular geometric shape such as for example a round tablet or cylinder, but rather have an irregular shape, as discussed below. The pellets comprise at least one biodegradable carrier which provides sticking and binding agents as well as optionally at least one pellet hardening agent and/or at least one dispersing agent. They are used in different combinations to provide a balance between the hardness of the pellet (provides integrity and reduces breaking) when handling, yet having the trait of rapid break down and dispersion in the soil to make it crop available quickly. Typical distance moved in seven days—0.75 to 1.5 cm with a maximum of at least 5 cm. In some embodiments, the pellets also include an oxide fertilizer.

In one embodiment of the invention, there is provided a fertilizer pellet comprising: a biodegradable carrier having an irregular shape and a rough surface; and a nutrient powder coating the carrier. As discussed herein, the pellet is arranged to blow apart on contact with soil moisture thereby dispersing the nutrient powder throughout the soil.

Another aspect of the invention is directed to a method of producing a fertilizer pellet comprising: providing a biodegradable carrier; heating the biodegradable carrier, thereby forming a mixture; extruding pellets from the mixture; compressing the pellets, thereby forming pellets having rough surface and an irregular shape; and coating the pellets with a nutrient powder. The nutrient powder may be at a final percentage of 0.1-2.0% w/w of the carrier. As will be appreciated by one of skill in the art, additional powder may be added but it will not be taken up by the pellets.

In another embodiment, there is provided a fertilizer pellet having an irregular shape and a rough surface comprising a biodegradable carrier, as discussed below. In these embodiments, additional nutrients may be added to the carrier during mixing rather than coated onto the finished pellet, as discussed below.

In another embodiment of the invention, there is provided a method of applying fertilizer to a field comprising: providing at least one fertilizer pellet having an irregular shape and a rough surface; and spreading said at least one pellet onto the field, wherein said at least one pellet disperses on contact with soil moisture.

In another embodiment of the invention, there is provided a method of producing a fertilizer pellet comprising: mixing at least one nutrient and a biodegradable carrier; heating the mixture; extruding pellets from the mixture; and compressing the pellets, thereby forming pellets having rough surface and an irregular shape.

In another embodiment of the invention, there is provided a method of coating a carrier with a nutrient comprising: mixing a carrier and a nutrient powder. As discussed below, the carrier may be any of a variety of products known in the field of agriculture, for example, seeds, clay pellets, urea prills and the like.

In another embodiment of the invention, there is provided the mixing of organic and/or chemical pesticides with the biodegradable carrier material and preparing pellets as described herein thereby providing an organic biodegradable pellet including at least one pesticide. In yet other embodiments, the pesticide(s) may be in the form of a powder and may be coated onto the pellet or other suitable carrier using the methods described below for preparing a coated carrier. In these embodiments, it is of note that other nutrients, fertilizers and the like may also be incorporated into the pellet and/or coated onto the pellet, thereby providing a product that promotes desired plant growth while inhibiting for example weed growth. In one exemplary but by no means limiting example, the biodegradable carrier is corn gluten as dandelion control in an organic "weed and feed" mix with pellets containing organic sources of NPKS along with added benefit of weed control.

Thus, the pellets and coated pellets described herein represent an improvement over prior art fertilizer pellets in that there are no compatibility or settling out issues, because lower rates are used, there is more even distribution of nutrients and the process is more cost effective.

The biodegradable carrier may include any crop meal, peas, wheat, barley, oats, flax, corn silage, compost material, canola meal, soybean meal, sunflower ash, sunflower meal and mixtures thereof. That is, the carrier is composed of for example organic materials or plant food products and/or byproducts. Typically, carriers are selected that are broken down over time by naturally occurring soil microbes generally in a time frame that is between 1-2 years depending on climatic conditions and soil types, but in most cases in a time frame that is similar to straw breakdown in tilled fields. Examples of other suitable carrier materials include for example recycled newsprint. This is in contrast with inert carriers such as clay which would not be broken down by soil microbes.

Examples of suitable hardening agents include but are by no means limited to calcium carbonate, lime, calcium sulfate, lignite and combinations thereof. It is of note that the hardening agents harden the pellet so as to give durability, reduce dust, but does not repel water. In fact, in some embodiments, the hardening agents may be arranged to expand on contact with water, thereby promoting dispersion and/or disruption of the pellet.

Examples of suitable dispersing agents include but are by no means limited to Morwet (and functional and/or commercial equivalents), yucca, lignin sulfonate, lignite, organic (humic, fulvic citric etc.) and or chemical acids and combinations thereof. It is of note that these dispersing agents aid in rapid dispersion of the pellet granules by preventing powders from sticking together. Specifically, the addition of a dispersing agent prevents clumping of the powder and allows water to encircle the granules of the powder, thereby promoting even dispersion of the pellet.

It is of note that in some embodiments, the dispersing agent may also be a chelating agent. Chelating or complexing agents are useful in keeping the nutrient from tying up as quickly in high pH soils, in essence keep the nutrient plant available for an extended period of time under adverse conditions.

As described herein, the fertilizer pellets are low analysis and low density and have an irregular shape and high granular dispersion. The low analysis means more granules are put in the seed row on application. This means the plant roots will have a greater area in which to uptake the nutrient, for example, copper. The granules have a density between 40-65 lbs per cubic foot or in some embodiments between 50-55 lbs. per cubic foot. This makes it similar to most macro fertilizers and allows it to blend well and not settle. The irregular shape of the granule allows it to hold well within a blend and not settle out. High granular dispersion means the granule will break up quickly in a moist soil which will allow the fertilizer to be absorbed by the plant roots. Thus, the pellet breaks up or disperses as quickly as possible in soil moisture so that powdered nutrients are dispersed throughout the root zone in water (rainfall and capillary action) and thus available to the plant for uptake. The small particle size also increases the number of feeding sites or contact points for the root to absorb the nutrient.

The availability of nutrients from applied fertilizers can be very controversial. Many different methods have been set up to simulate availability. However, the fact that soil is a bio-entity unto itself lends to a high level of uncertainty as to how fertilizers will react when soil-applied. Factors such as for example microbial activity, organic matter, pH, background levels, moisture, temperature, and the like all impact on how a fertilizer will respond.

With most fertilizers other than nitrates, sulfates, and chlorides, the nutrient is not very mobile in the soil and tend to bind themselves to organic matter or to the exchange sites on clay. The low mobility of elements like P, K, Ca, Mg, and trace metals generally means that the roots of the plants have to intercept the nutrient at the point of contact of the nutrient with the soil. This is one of the reasons banding has become the primary way of applying nutrients wherein more pellets of fertilizer are put closer to where plant roots can contact them. What this also means is that the more pellets of fertilizer applied, the more is the potential for root contact. This does not mean applying more nutrient but applying more pellets each having lower density or lower % nutrient level.

Water solubility of fertilizers is a test methodology that gives the quantity of fertilizer nutrient that is directly water soluble. It is not a method that gives plant availability although it is sometimes used that way. Water soluble nutrients are those that are in a sulfate, or nitrate, or chloride, or chelated form. When dissolved in the soil, they will react with different constituents in the soil and form an equilibrium between plant available and unavailable forms. All of the items listed above, such as moisture, pH, organic matter and microbial activity have a bearing on this equilibrium. A chelating agent will tend to push more of the chelated nutrient into the plant available form and help to hold it there longer so that the plant has a better chances of taking it up through the rooting system.

Oxides of fertilizers are generally used in building up levels of nutrients in the soils and applications will usually cover several years supply of nutrients. Foliar applications of sulfate form or chelated form are usually used as an immediate corrective application to the growing plant and do not add to the soil reserve. What fertilizer to use (oxide, sulfate, or chelate) will depend on how critical the deficiency is and how quickly it needs to be corrected.

As discussed above, studies of powdered oxide fertilizers show them to be effective and equivalent to sulfate applications. As described below, the instant process allows the application of powders as pellets that disperse rapidly and readily under normal soil moisture conditions and in a range of soil textures, as discussed below.

Most oxide products come in high analysis (60-80 percent actual metal). Most micronutrients are applied in low units per land measure (e.g. 1-10 pounds actual per acre) To enhance performance of the product applied at low rates per unit measure we dilute the concentration to ensure uniform distribution through existing agricultural seeding and application equipment, as discussed below.

Many micronutrient products are applied in heterogeneous blends with other fertilizers (nitrogen phosphate etc.) These products and/or blends typically have densities in the 45-65 lb per cubic foot range. This is in contrast with existing micronutrient products which are typically in the 95+density range meaning that they do not hold their integrity in the blend if transported over rough terrain as is common in agriculture. An additional benefit of this low density is increasing the number of pellets per pound, so feeding and contact sites with plant roots are increased exponentially versus other products.

As described below, in some embodiments, part of the production process includes applying pressure or by other means known in the art crushing or breaking of finished pellets thereby producing pellets having irregular shapes, that is, non-geometric shapes. This achieves two objectives. First it aids in keeping the blend integrity by creating rough and irregular shaped pellets which hold together by friction. Second, it expedites the break up of the pellet in the soil by providing more surface area for water absorption, and lessens the integrity of the pellet. Thus, the rough surface provides friction which keeps pellets in blend, and also creates more surface area for water absorption. The term "rough surface" indicates that the pellet includes for example, prills, pits, divots and the like thereby forming a generally uneven surface.

As described below, biodegradable carriers are used in different combinations to provide a balance between the hardness of the pellet which provides integrity and reduces breaking when handling, and rapid break down and dispersion in the soil to make it crop available quickly. Calcium carbonate and lignin sulfonate are used depending upon the product produced as pellet hardeners and dispersing agents. These biodegradable products also provide a minimum amount of naturally occurring nutrients and minerals.

In other embodiments, the pellets comprise canola meal, potassium sulfate, calcium sulfate, calcium carbonate and chelated iron, thereby forming an organic product.

The nutrient or nutrient powder may be, for example, zinc, copper, manganese, boron, calcium, iron, calcium sulfate (gypsum), magnesium, molybdenum, chloride, selenium, phosphate, nitrogen, potassium, sulfur or combinations thereof. By way of illustrative but in no way limiting examples, copper may be copper (cupric): hydroxide, chloride, sulfate, oxide, oxysulfate, nitrate, carbonate, ammonium carbonate, cupric chloride dihydrate, proteinate, acetate, citrate, chelate, complex, or sequestered; zinc may be zinc: acetate, amoniated zinc, ammonium chloride, sulfate, oxide, oxysulfate, nitrate, chloride, citrate, chelate, or complex sequestered; manganese (manganous) may be manganese: nitrate, chloride, sulfate, oxide, oxysulfate, acetate anhydrous, carbonate, potassium mangagnese sulfate, acetate tetrahydrate, nitrate hexahydrate, citrate, chelate, or complex sequestered. Boron may be: boric acid, sodium borate, potassium tetraborate tetrhydrate, calcium borate, calcium-sodium borate, US Borax Products tradenames—solubor™ (disodium octoborate tetrahydrate), Optibor™ (orthoboric acid), granubor™, borax™, or fertibor™; Calcium may be calcium: carbonate, chloride, sulfate, gypsum, calcium borate, lime, nitrate, phosphate, citrate, chelate, or complex sequestered; and Iron may be iron: sulfate, sulfate anhydrous, chloride, tetrahydrate, hexahydrate, nitrate, nitrate nonahydrate, chloride hexahydrate, ammonium citrate, ammonium sulfate, chelate, sequestered, proteinate or complex.

The oxide form of the nutrient or nutrient powder may be, for example, copper oxide, produced, for example, by pyrolysis of copper nitrate, zinc oxide, produced, for example, by pyrolysis of zinc nitrate or carbonate, manganese oxide or the like or boric acid, manganese sulfate or the like. As will be appreciated by one knowledgeable in the art, other nutrients or nutrient powders may be similarly prepared using means known in the art.

As will be apparent to one knowledgeable in the art, the nutrient or nutrient powder may have any suitable or desirable nutrient concentration, whether a single nutrient or a combination thereof. That is, the concentration of the nutrient(s) may vary from 1-99%, depending upon intended use and application conditions. In some embodiments, the fertilizer may have a nutrient concentration of, for example: 5-45% zinc; 5-45% copper; 5-45% manganese or a mixture of 7% copper, 7% zinc and 6% magnesium. As will be apparent to one knowledgeable in the art, the concentrations of the nutrients may be varied according to customer preference, soil conditions and/or need, depending on the circumstances. Other embodiments are shown in the examples.

As will be apparent to one of skill in the art, the individual nutrients may be at any suitable level, for example, from trace amounts or 0.1% to 50% actual.

As described herein, in some embodiments, the carriers consist of organic and/or inert components.

As described below, the time required for the nutrient to leave the pellet and enter the soil takes no longer than seven days and is often immediate. As described below, tests indicate that the nutrients moved typically 0.75 to 1.5 cm with a maximum of 5 cm in the soil in seven days.

According to the invention, a carrier, for example, a pellet, a seed, a dry fertilizer, a granular fertilizer, a fertilizer granule, a urea prill or the like is coated with at least one micronutrient powder or nutrient powder as follows. A quantity of the carrier prepared is mixed with the at least one micronutrient powder. Specifically, the micronutrient is a dry, fine powder, typically at least 100 mesh, in other embodiments, a mixture of 100 mesh and 325 mesh and in yet other embodiments, at least 325 mesh, and is added to the carrier. The carrier is mixed with the powder such that the powder is 0.1-2.0% (w/w) of the weight of the carrier and coats the outer surface of the carrier. Optionally a dispersing agent, as discussed above, may be added to the nutrient powder prior to mixing with the carrier. Specifically, the dispersing agent prevents the powder from sticking to itself, thereby promoting coating of the carrier. The end result is that the micronutrient is present at a low enough ratio that self-adhesion is minimized and coating of the support or carrier is promoted. It is of note that the dispersing agent may be used at a volume of 5% (w/w) relative to the nutrient powder. Furthermore, static electricity generated during the mixing process further promotes adhesion of the fine powder to the carrier although this is not an essential feature of the invention and coating occurs efficiently in the absence of static electricity.

It is of note that the specific mesh size utilized may depend on the nutrient itself. That is, some nutrient powders may adhere at 325 mesh while others may only adhere at 100 mesh. It is also of note that dispersing agents may not be needed with all nutrients. For example, some forms of boron and iron coat effectively without the addition of a dispersing agent.

As will be apparent to one of skill in the art and as discussed above, the coating powder may comprise a single nutrient or a mixture of nutrients, for example, copper and zinc or copper, boron zinc and iron and the like or mixtures of forms of nutrients (two or more oxides, two or more sulfates or a mixture of oxide(s) and sulfate(s)) or chloride, nitrate, carbonate forms and the like. In addition, the powder may include other suitable compounds, for example, pesticides, organic pesticides and the like.

It is of note that the nutrient powder may comprise any suitable form of any one of or any combination of any of the micronutrients described above. This may include for example, chlorides, nitrates, carbonates and the like. In addition, powders may be combinations, for example, of mangagnese chloride and sulfate or a mix of nitrate, carbonate and sulfate. In yet other embodiments, the nutrient powder may be a chelated (chemical) or complexed (organic) form of the micronutrient. That is, the nutrient powder may comprise a fine, dry powder of any desirable micronutrient in a chemical form such that the powder coats the agronomic carrier, as described herein.

As will be apparent to one of skill in the art, the above-described method differs from the prior art in that it does not require the mixing of liquids with dry materials. That is, in the above-described method, a dry powder is mixed with dry carrier. This in turn eliminates the inherent degradation of the final product and also avoids the extensive use of drying agents.

The agronomic benefits are the ability to apply finely divided powders to the soil, thereby increasing the surface area of these nutrients in contact with the soil and increasing the efficiency of the specific nutrient applied both in the field and to the carrier. This type of application also distributes the product evenly throughout the root zone of the plants avoiding areas of high concentration and low concentration that may occur when granular products are applied.

As will be apparent to one of skill in the art, other weight ratios may also be used, depending on the weight and surface area of the supports coated. In preferred embodiments, these supports are granules or are prilled, thereby providing surface area for nutrient coating.

In yet other embodiments, other supports or agronomic carriers may be coated with the micronutrient, for example, seeds, Nitrogen, Phosphate, Potassium, Sulfur, Calcium and/or Magnesium fertilizer products including urea, ammonium nitrate, ammonium sulfate, monoammonium phosphate, diammonium phosphate, potassium chloride, potassium sulfate, calcium sulfate (gypsum), calcium carbonate (lime), magnesium sulfate and chloride etc. as well as mixes (blends) of above and any other dry or granular fertilizer product (including water soluble forms) or inert or biodegradable pellets known in the art, for example, inocculants. In addition, inert carriers such as limestone, clay or other products used as fillers in fertilizer or homogenous mixes of the above products may also be used as carriers, that is, may be coated with the dry fine nutrient powder as described herein. Thus, in these embodiments, the selected carrier is mixed with the nutrient powder and is coated to a final concentration of 0.1-2.0% (w/w) by the nutrient powder. In some embodiments, a seed may be coated to a concentration of for example approximately 0.05%-0.5% (w/w) with a nutrient powder as described above. As will be apparent to one of skill in the art, this places the nutrient in the precise location necessary for availability for seed emergence.

It is of note that in one exemplary embodiment, the seeds are also coated with a fungicide, for example, copper oxide or a similar fungicide. As will be apparent to one of skill in the art, this places the fungicide in the precise location necessary for availability for seed emergence. The fungicide may be any suitable fungicide known in the art and will typically be selected based on the type of seed and the soil conditions and/or location of the planting site. It is of note that in some embodiments the fungicide is a fine powder and may also be mixed with a dispersing agent to promote even coating of the seed as discussed above for the nutrient powders.

In another aspect of the invention, there is provided a kit for coating a suitable carrier with a nutrient powder, the kit comprising a nutrient powder as described above having a mesh size of at least 100 and a set of instructions. The instructions may be printed matter or may be stored in electronic means, for example, on a diskette or CD-ROM. The instructions will describe how to apply the nutrient powder to a carrier, for example, but by no means limited to, pellets, seeds, Nitrogen, Phosphate, Potassium, Sulfur, Calcium and/or Magnesium fertilizer products including urea, ammonium nitrate, ammonium sulfate, monoammonium phosphate, diammonium phosphate, potassium chloride, potassium sulfate, calcium sulfate (gypsum), calcium carbonate (lime), magnesium sulfate and chloride. That is, the instructions will describe how much powder is to be added to a given quantity of carrier, how long the carrier and the powder should be mixed as well as what device and/or conditions are suitable for mixing. In some embodiments, the nutrient powder may be pre-mixed with a dispersing agent or a dispersing agent may be included within the kit. The kit may comprise more than one nutrient powder. The mesh size of the individual nutrient powders may be at least 100 mesh, at least 325 mesh or a mixture of 100 mesh and 325 mesh. It Is of note that finer meshes, for example 400 mesh, may also be used either alone or in combination with other suitable mesh sizes.

The invention will now be described by way of examples. However, the invention is not in any way limited by the examples.

EXAMPLE I

Process Directive Granular Products

Calcium Carbonate, Active Mineral, Lignite=25%
15% Products: Crushed Screenings (containing cereals, canola, peas)=75%
Complex Products: 1% Canola Oil
Batch Size 1,000 kg
Order of Addition: 1) Screenings 2) Actives 3) Calcium 4) Oil
Spout Junior Pellet Mill
Mixing Time: While filling and after filling additional 3-5 minutes.
Temperature: 140 to 200 degrees F.
5/64 dies used to extrude pellets
Pellets crumbled (compressed) through 2×36 inch rollers
Moved upwards to bin via 50-foot leg
Moved down to bagger via 40 foot down pipe
Packaged using spout bagger Thus, generally speaking, fertilizer (for example, pellets), seed or other materials are added to a blender. Powdered micronutrients are added to the blend (at any time in the process) at rates up to but not exceeding 1% of the total blend. The resulting blend is mixed for a minimum of 20 seconds resulting in an even distribution (coating) of the total blend. The finished product is then applied to the field or stored for later applications.

EXAMPLE II

Solubility and Movement of Pelleted Cu Fertilizer In Soil

The study was conducted using columns of air-dried soil. In order to ensure uniformity, the soil was crushed (not pulverized) so that it passed through a 2.00 mm sieve. The columns were 4.4 cm inside diameter and were made up of sections either 1.0 or 0.5 cm in thickness. The columns, from the top down, was constructed as follows:

3-1 cm thick sections containing soil
2-0.5 cm thick sections containing soil
1-0.5 cm thick section containing Cu fertilizer pellets
2-0.5 cm thick sections containing soil
5-1 cm sections containing soil Once the columns were constructed, water was added from the top until the wetting front reached the top of the bottom most section containing soil. (This ensured that the soil was not saturated. With time, water was redistributed to an "equilibrium" moisture content called "field capacity", which is common under field conditions.) The columns were then allowed to stand for 7 days to allow for dissolving and movement of the Cu fertilizer. The soil at the top of the columns was not covered, i.e. water was allowed to evaporate from the soil surface just as might occur under field conditions. At the end of this time, the column was sectioned, with the soil from each section being placed in a separate container. The containers of soil were oven dried and then submitted to NorWest labs for analysis of Cu concentration.

The study was conducted with three soils representing a range of soil textures, Osborne clay (legal description W 31-4-3E), Newdale clay loam (legal description SW 28-14-18W), and Almasippi sandy loam (legal description SE 23-8-5W). In addition, with each soil, the experiment was replicated three times. (This amounted to about 65 soil samples to be analyzed.)

Volume Change

Because the upper surface of the soil columns was exposed to the air, drying took place from the soil surface. Thus, when the columns were sectioned, it was observed that a certain amount of shrinkage accompanied the drying of soil. This shrinkage was greatest in the Osborne soil and least in the Almasippi soil. The consequence of this shrinkage was that the layer of fertilizer moved down from its original position and thus the section immediately below the fertilizer band was likely contaminated with the fertilizer. It should be noted, however, that since the soil moved downward, the layer above the fertilizer band was in all likelihood not contaminated. Thus, a Cu concentration above background in this section would indicate an upward movement of Cu during the experiment.

Soil Moisture

As well as copper analysis, the sections of soil in the columns were oven dried to determine the water content distribution. An example of this is given in FIG. 1. Several features of this graph are noteworthy. The top part of the column had a lower water content than the lower portion. (The vertical distance labeled zero was the position of the layer of copper fertilizer pellets.) The top of the column was not covered and thus evaporation took place from this surface. Although not strictly comparable, this would be analogous to drying under field conditions after a rain, i.e. layers of soil closest to the surface would have the lowest water contents. Furthermore, the highest water content occurred in the soil layer just below the section containing the Cu fertilizer. It should be noted that water content is expressed as a percentage by weight. It was observed that the section just below the fertilizer layer did in fact contain some fertilizer pellets. (This was the result of the volume change in the soil that occurred due to redistribution of water and drying. This is a natural occurrence and there is really nothing that can be done to prevent it.) Thus, the higher water content at this position was not a concentration of water but rather a result of the fact that on a weight basis the fertilizer pellets tend to absorb more water than soil. Below the fertilizer layer, the soil has a relatively uniform water content to the bottom of the column. This water content can be assumed to be near the "field capacity" of the soil, which is defined as soil water content when redistribution of water is complete. It is likely representative of soil water content one or two days after a significant rain. Thus, any solution and redistribution of the Cu fertilizer in the columns would be very similar to that which might occur under field conditions. Graphs of water content vs. vertical distance for the other soils and replicates were similar to that shown above.

Distribution of Cu

The concentration of Cu in each section of each run of each soil was determined by Norwest labs. These individual data are given in the Appendix. Data for each section position for each soil were averaged and are presented in Table 1. Averages for the Almasippi and Osborne soils are from three runs and those for the Newdale soil are from two runs.

TABLE 1

Average Cu concentrations (ppm) in columns of soil initially brought to field capacity and allowed to dry from the surface for 7 days.

| Depth | Soil | | |
|---|---|---|---|
| (cm) | Almasippi | Newdale | Osborne |
| 3.5 | 0.90 | 2.54 | 4.90 |
| 2.5 | 1.02 | 2.95 | 4.69 |
| 1.5 | 0.84 | 2.86 | 4.64 |
| 0.75 | 1.01 | 2.13 | 4.95 |
| 0.25 | 9.81 | 18.90 | 310.33 |
| −0.25 | 583.00 | 40.33 | 165.67 |
| −0.75 | 5.65 | 5.58 | 6.92 |
| −1.5 | 1.20 | 3.58 | 5.46 |
| −2.5 | 0.98 | 2.86 | 4.82 |
| −3.5 | 0.93 | 2.73 | 4.76 |
| −4.5 | 1.21 | 2.76 | 4.72 |
| −5.5 | 1.89 | 3.70 | 6.14 |

Positive depths Indicate distance above the fertilizer band and negative depths distance are below the fertilizer band Several observations can be made from the Table. Layers 1.5 cm and farther from the fertilizer band show an approximately uniform Cu concentration and therefore may be regarded as the background levels, i.e. the concentration of Cu in unfertilized soil. The background levels appear to be about 1.0-1.2 ppm for the Almasippi soil, 2.7-2.9 for the Newdale soil, and 4.7-4.9 for the Osborne soil. For all three soils there appears to be an accumulation of Cu in the very lowest section of the soil column. Although this did not occur in every individual replicate, it did occur for most (see Appendix). In other words, this occurrence is consistent enough that it is not likely strictly due to chance. One might speculate that as the water proceeded through the column, a small amount of Cu was dissolved from the fertilizer band and carried in solution to the lower most section. (It should be noted that the columns were watered just enough for water to reach the lower most section, i.e. no water was drained through the column.) Thus, it would appear that there is at least a small amount of Cu in the fertilizer that is very easily soluble. For all soils there was a high concentration in the sections immediately above and below the fertilizer band. As has been pointed out above, this high concentration in the section immediately below the fertilizer may be due to contamination. It is unlikely that the section above the fertilizer band was contaminated. It would appear that with time Cu was dissolved and moved upward with water as the latter moved upward during drying of the columns. Water content profiles shown above indicate that there was considerable drying in the sections above the fertilizer band during the course of the experiment. Although the section immediately below the fertilizer band—designated as−0.25—was probably contaminated, it is most unlikely that the depth designated as−0.75 was contaminated. Thus, the higher concentrations of Cu in these layers—which occurred in all three soils—were probably due to solution and diffusion of Cu during the course of the experiment. In fact, the next lower layer—designated as−1.5—seems to show an accumulation of Cu, at least in the Newdale and Osborne soils.

As can be seen, Cu from the fertilizer material is dissolved under "normal" field moisture conditions and moves in solution and diffusion over significant distances.

EXAMPLE III

Effects of pelleted zinc and copper on field peas

Pelleted copper and zinc applied to a sand medium and grown under controlled conditions resulted in an increase in copper and zinc levels in peas grown in the medium. Copper content increased by approximately 45 percent and zinc content increased by approximately 16 percent.

Third party agencies were used to set up and execute the experiment (AgQuest Inc of Minto, Manitoba) and to do laboratory analysis on the tissue extracted from the trials (Norwest Labs). Treatments included:

1) Untreated check (UTC or UNT)
2) Pelleted Zinc at 15 lb/acre of actual zinc (0.84 g/flat)
3) Pelleted Copper at 15 lb/acre of actual copper (0.84 g/flat)

The 4 replicate trial was seeded into 11"×22"×2" deep flats filled with commercially available sand. The Zinc and Copper treatments were placed in furrow with the seed.

A total of 12 flats were planted (4 flats per treatment) and had a single crop thinned to 24 plants in two rows (12 plants per row). Seed was untreated and No-Damp (oxine benzoate) was applied once at emergence to prevent any damping off. No fertilizer was added to the flats at any time during the growing period. Seedlings were grown under shelter and watered 3 times weekly for 5½ weeks until they reached the 6 leaf stage.

At the 6 leaf stage, top-growth was removed and plants from each flat were packaged and shipped to Norwest Labs for tissue analysis. Samples were identified as follows:

| SAMPLE I.D. | SAMPLE DESCRIPTION | NORWEST TEST ID |
|---|---|---|
| 1 | PEAS-UTC | TIS4 |
| 2 | PEAS-UTC | TIS4 |
| 3 | PEAS-UTC | TIS4 |
| 4 | PEAS-UTC | TIS4 |
| 5 | PEAS-ZINC | TIS4 |
| 6 | PEAS-ZINC | TIS4 |
| 7 | PEAS-ZINC | TIS4 |
| 8 | PEAS-ZINC | TIS4 |
| 9 | PEAS-COPPER | TIS4 |
| 10 | PEAS-COPPER | TIS4 |
| 11 | PEAS-COPPER | TIS4 |
| 12 | PEAS-COPPER | TIS4 |

Results

Raw data quantifying copper and zinc levels for the untreated checks and for the zinc and copper treatments are attached. A Student t-test (two-tailed) was run for the data assuming homogeneous variability for all pairs was run.

1) Pelleted copper on peas

No visual difference was observed between treatments at any time during the growth period. However, the peas growing in the copper treated flats contained 65.5 ppm of copper. Peas grown in flats without the addition of the pellets contained only 56.2 ppm of copper. Standard error for the test was 0.657 ppm. The probability of the differences being due to random sources is p=0.018.

2) Pelleted zinc on peas

No visual difference was observed between treatments at any time during the growth period. However, the peas growing in the zinc treated flats contained 65.5 ppm of zinc. Peas grown in flats without the addition of the pellets contained 56.2 ppm of zinc. Standard error for the test was 3.08 ppm. The probability of the differences being due to random sources is p=0.056.

CONCLUSIONS

In both comparisons, application of the pelleted products resulted in an increase in plant tissue levels of copper and zinc. Pea tissue in the pelleted copper treatment contained 45 percent more copper than untreated checks. Pea tissue in the pelleted zinc treatments also showed a trend of increased micronutrient levels as a result of application of the pellets, with treated peas containing 16 percent more zinc than untreated products.

Figure 4:
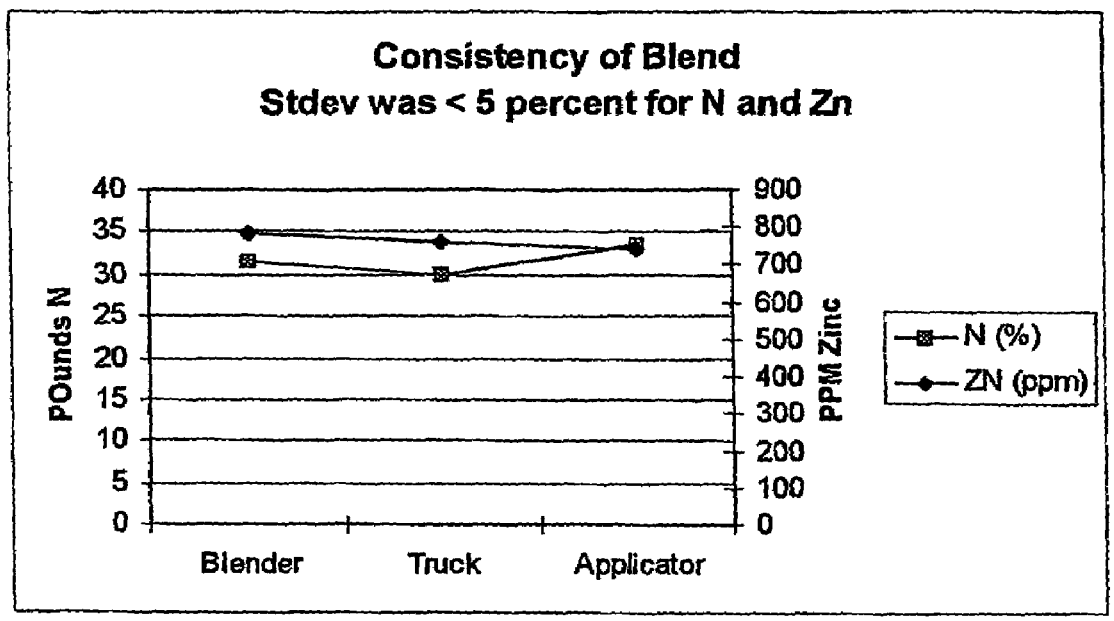
FIG. 4 is a graph showing consistency of blend.
Figure 5:
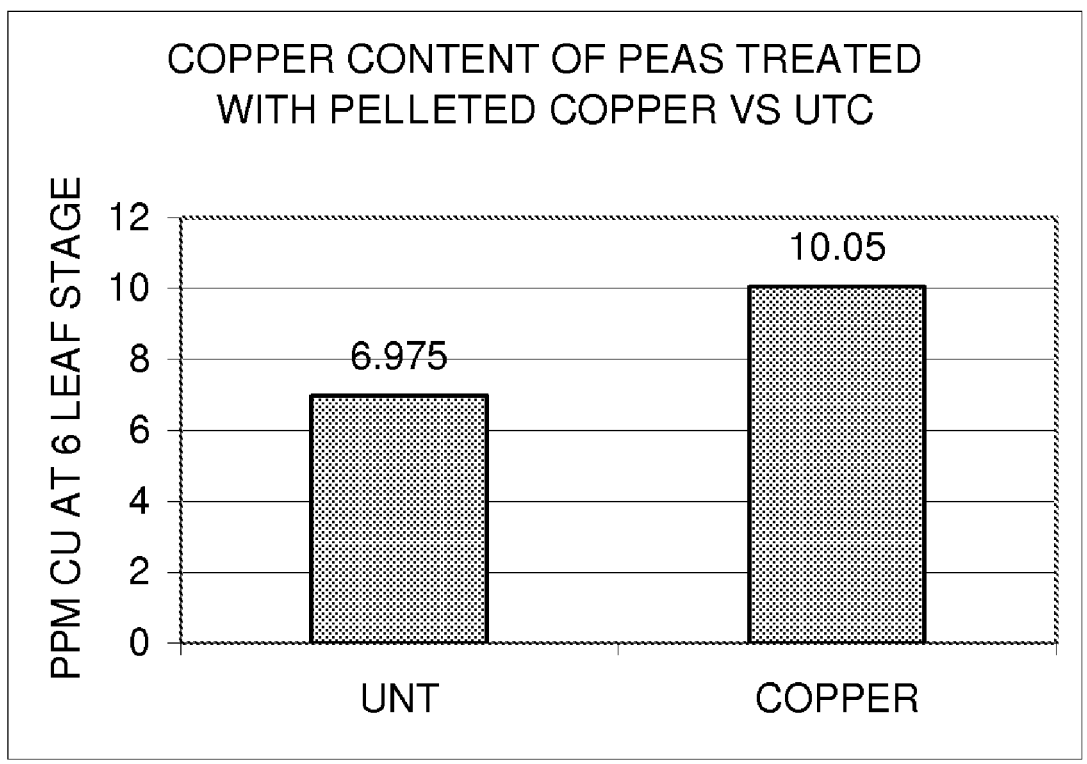
FIG. 5 is a bar graph showing copper content of pea tissue following treatment with pelleted copper discussed in Example III.
Figure 6:
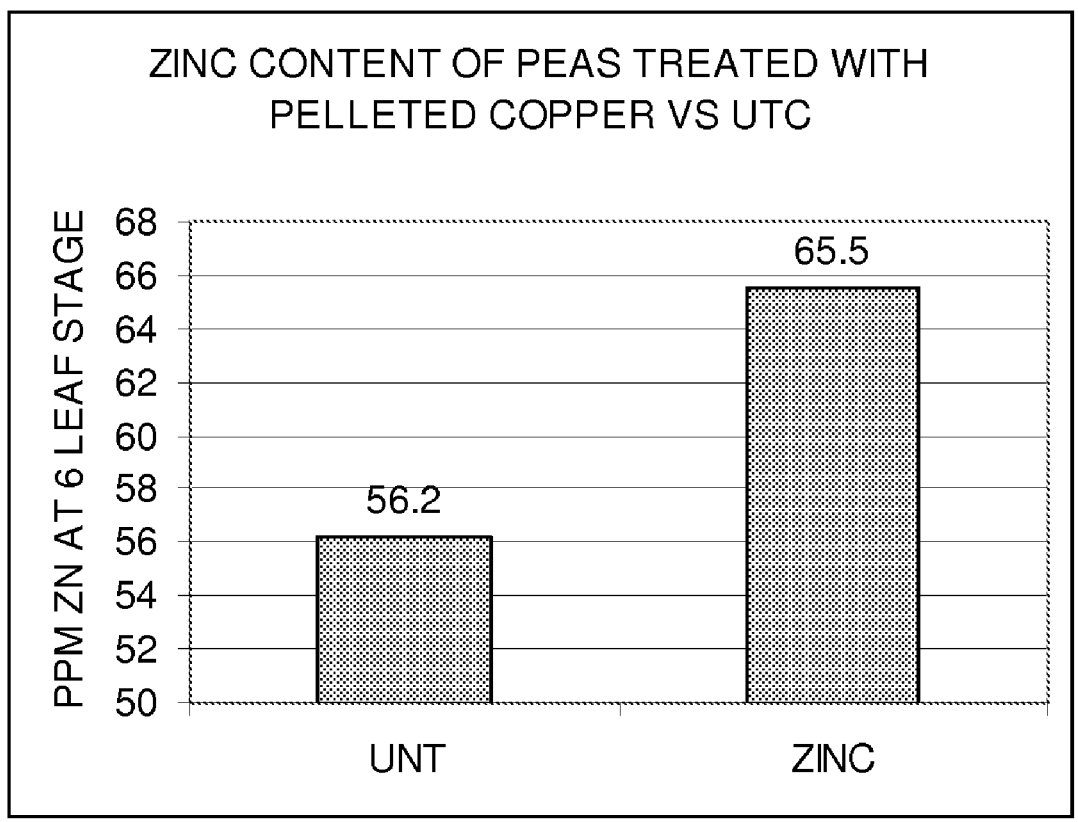
FIG. 6 is a bar graph showing zinc content of pea tissue following treatment with pelleted zinc discussed in Example III.

Coating technology was also appraised in terms of blend stability in fertilizer mixers and transportation equipment and efficacy to crop plants in statistically designed field plots. The product remains stable throughout transportation and mixing and does not "fall out" or show undesirable characteristics as would be defined by fertilizer industry personnel, as shown in FIG. 4.

The coating was applied by commercial scale blenders and applied by commercial scale field equipment. At time of between two and five weeks after emergence of the crops, tissue testing was conducted on randomly collected crop material from treated and untreated portions of the field. Results are shown in Table 2.

TABLE 4

| Retailer | Micronutrient | Crop | Increase in tissue nutrient (%) |
|---|---|---|---|
| Terraflex | Zinc | Corn | 59.5% |
| Rosenort | Zinc | Corn | 17.0% |
| Dynagra | Copper | Wheat | Droughted |
| St. Leon | Copper | Oats | 9.5% |
| St. Leon | Copper | Oats | 40.0% |
| Cunningham | Copper | Barley | 54.0% |

Figure 3:
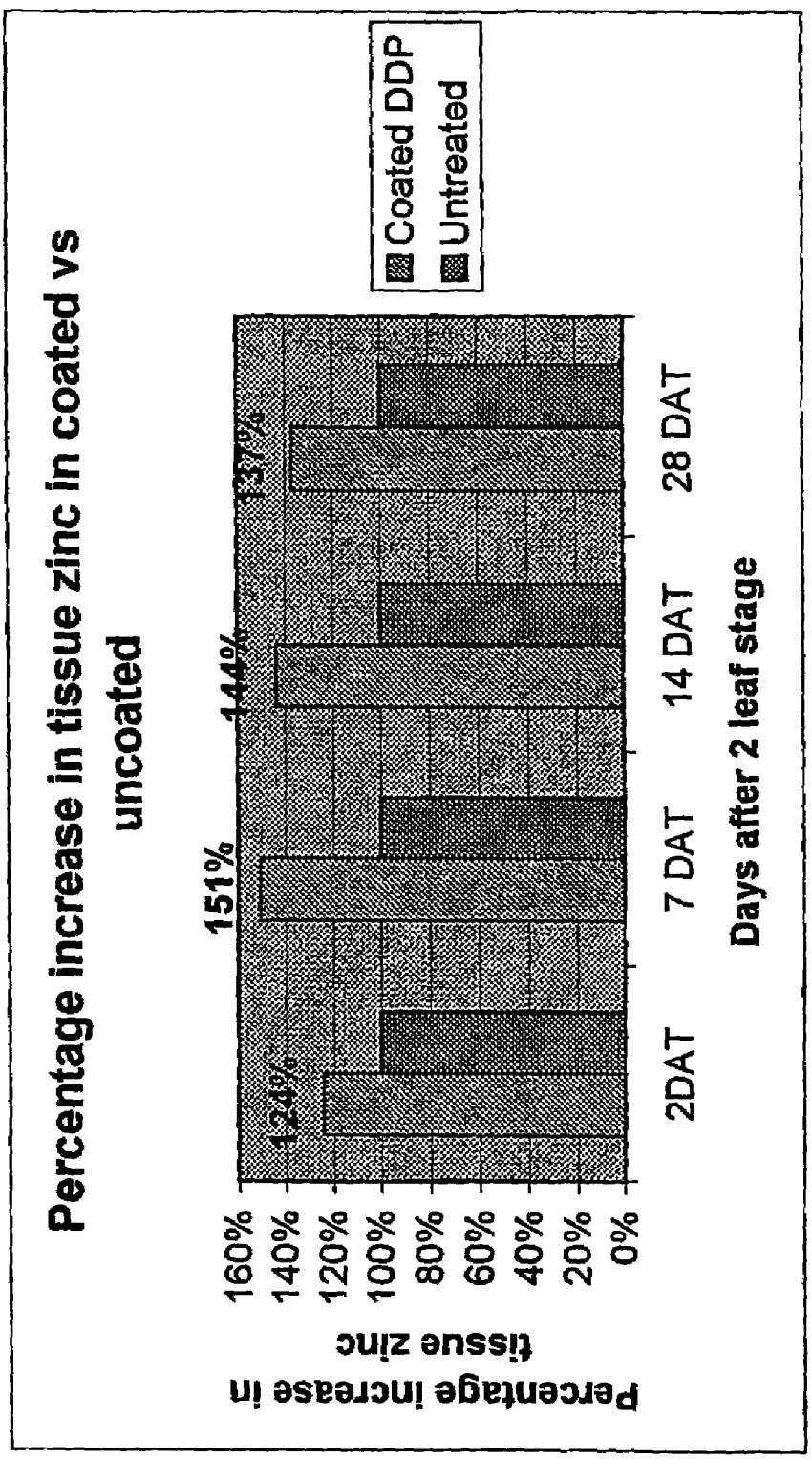
FIG. 3 is a bar graph showing percentage increase in tissue zinc in coated vs uncoated pellets.

Trials were conducted by ICMS Inc, an independent agronomic testing company. As shown in FIG. 3, the data shows trends towards increased levels of micronutrients in the crops tested compared to uncoated fertilizer.

While the preferred embodiments of the invention have been described above, it will be recognized and understood that various modifications may be made therein, and the appended claims are intended to cover all such modifications which may fall within the spirit and scope of the invention.

The invention claimed is:

1. A fertilizer product comprising a dry agronomic carrier coated with a fine dry powder of a micronutrient such that said micronutrient coats the outer surface of the carrier, wherein the micronutrient powder is 100-325 mesh and is at 0.1%-2.0% (w/w) of the carrier.

2. The fertilizer product according to claim 1 wherein the agronomic carrier is selected from the group consisting of: seeds; Nitrogen, Phosphate, Potassium, Sulfur, Calcium and/or Magnesium fertilizer products; urea prills; dry or granular fertilizer products; and inert or biodegradable pellets.

3. The fertilizer product according to claim 1 wherein the dry micronutrient powder is selected from the group consisting of: zinc, copper, manganese, boron, iron, molybdenum, and mixtures thereof.

4. The fertilizer product according to claim 1 wherein the micronutrient powder is in an oxide form.

5. The fertilizer product according to claim 1 wherein the micronutrient powder is in a sulfate form.

6. The fertilizer product according to claim 1 wherein the micronutrient powder is a combination of sulfate and oxide forms of at least one micronutrient.

7. The fertilizer product according to claim 1 wherein the micronutrient powder includes a dispersing agent.

8. A method of coating an agronomic carrier with a micronutrient comprising:

mixing a quantity of the dry agronomic carrier and a dry fine powder of the micronutrient wherein the micronutrient powder is 100-325 mesh and is at 0.1%-2.0% (w/w) of the carrier such that said micronutrient coats the outer surface of the carrier.

9. The method according to claim 8 wherein the agronomic carrier is selected from the group consisting of: seeds; Nitrogen, Phosphate, Potassium, Sulfur, Calcium and/or Magnesium fertilizer products; urea prills; dry or granular fertilizer products; and inert or biodegradable pellets.

10. The method according to claim 8 wherein the dry micronutrient powder is selected from the group consisting of: zinc, copper, manganese, boron, iron, molybdenum, and mixtures thereof.

11. The method according to claim 8 wherein the micronutrient powder is in an oxide form.

12. The method according to claim 8 wherein the micronutrient powder is in a sulfate form.

13. The method according to claim 8 wherein the micronutrient powder is a combination of sulfate and oxide forms of at least one nutrient.

14. The method according to claim 8 wherein the carrier is a seed.

15. The method according to claim 8 wherein the carrier is a pellet.

16. The method according to claim 8 wherein the carrier is a fertilizer granule.

17. The method according to claim 8 wherein the carrier is an inert pellet.

18. The method according to claim 8 wherein the micronutrient powder is mixed with a dispersing agent prior to mixing the micronutrient powder with the carrier.

* * * * *